United States Patent [19]

Rim et al.

[11] Patent Number: 4,668,834
[45] Date of Patent: May 26, 1987

[54] LOW MOLECULAR WEIGHT ETHYLENE-ALPHAOLEFIN COPOLYMER INTERMEDIATES

[75] Inventors: Yong S. Rim; Demetreos N. Matthews, both of Bethany, Conn.

[73] Assignee: Uniroyal Chemical Company, Inc., Middlebury, Conn.

[21] Appl. No.: 787,869

[22] Filed: Oct. 16, 1985

[51] Int. Cl.$^4$ .................... C08F 210/16; C08F 210/18
[52] U.S. Cl. ........................................ 585/12; 585/10; 585/18; 585/510; 585/512
[58] Field of Search ............... 526/160, 165, 282, 283, 526/336, 338.1, 338.2, 338.3, 338.4, 338.5, 338.6; 585/12, 510, 512, 10, 18

[56]  References Cited

U.S. PATENT DOCUMENTS

| | | | |
|---|---|---|---|
| 3,242,099 | 3/1966 | Manyik et al. | 252/429 |
| 3,522,180 | 7/1970 | Sweeney et al. | 585/12 |
| 3,598,552 | 8/1971 | Cohen et al. | 585/12 |
| 3,660,057 | 5/1972 | Ilnyckyj | 585/12 |
| 3,697,429 | 10/1972 | Engel et al. | 585/12 |
| 3,974,132 | 8/1976 | Valdiserri | 526/20 |
| 4,404,344 | 9/1983 | Sinn et al. | 526/160 |
| 4,542,199 | 9/1985 | Kaminsky et al. | 526/160 |

FOREIGN PATENT DOCUMENTS 0069951  7/1981  European Pat. Off. ............ 526/160

OTHER PUBLICATIONS

John A. Ewen, "Mechanisms of Stereochemical Control in Propylene Polymerizations with Soluble Group 4B Metallocene/Methylalumoxane Catalysts"—J. Am. Chem. Soc. vol. 106, pp. 6355-6364 (1984).
Sinn et al., "Ziegler-Natta Catalysts", Advances in Organometallic Chemistry, vol. 18, pp. 99-149.

Primary Examiner—Asok Pal
Attorney, Agent, or Firm—William E. Dickheiser

[57] ABSTRACT

Low molecular weight copolymers comprised of ethylene, an alphaolefin and (optionally) a nonconjugated polyene, which copolymers have a viscosity index of at least about 75 and vinylidene-type unsaturation, possess unexpected advantages as intermediates in epoxy-grafted electrical encapsulation compositions.

21 Claims, No Drawings

LOW MOLECULAR WEIGHT ETHYLENE-ALPHAOLEFIN COPOLYMER INTERMEDIATES

FIELD OF THE INVENTION

This invention is directed to low molecular weight ethylene/alphaolefin/(optionally) nonconjugated polyene copolymers possessing vinylidene-type unsaturation, which copolymers are useful as intermediates for epoxy-grafted electrical encapsulation compositions.

BACKGROUND OF THE INVENTION

Electronic circuitry is frequently employed in situations wherein it is subjected to adverse environmental conditions and/or to physical stress including shock and mechanical abuse, as well as to severe point pressure and abrasion. In order to protect such sensitive circuitry, it has become known to embed circuitry in an encapsulation composition. The materials employed in such encapsulation compositions must possess high electrical resistivity and should exhibit high arc resistance and track resistance in order to protect circuitry from moisture, physical shocks, and the like.

Among the materials which have been found to exhibit highly desirable properties for encapsulation purposes are copolymers of ethylene, propylene and a nonconjugated diene (i.e., "EPDM"). Thus, U.S. Pat. No. 3,974,132 to Valdiserri discloses the insulation and coating of electrically conducting wire with EPDM which is crosslinked with a trialkyl phosphate. However, several disadvantages are associated with the use of EPDM polymers such as those disclosed in this patent.

Primary among these disadvantages is that in order to cure such EPDM compositions a curing agent (typically a peroxide) is required, and, consequently, heat must be applied to cause curing to be initiated. Because much electronic circuitry is temperature sensitive, the thermal shock encountered by the curing of such polymers may damage the circuitry to be protected.

Moreover, the EPDM employed in the Valdiserri and other similar processes is a high molecular weight material which must be pelletized. Consequently, in order to adapt the embedding composition to the configuration of the circuitry to be protected, such pelletized EPDM must be simultaneously subjected to heat and pressure. The thermal and mechanical shocks resulting from such heat and pressure may cause damage to sensitive electrical circuitry.

In addition, such pressure and temperature requirements prohibit the accomplishment of on-site encapsulation, e.g., for the protection of splices or other on-site repairs.

In order to overcome these difficulties, copending U.S. patent application No. 787,870, filed Oct. 16, 1985, discloses certain liquid epoxy-modified embedding compositions which are pourable and which, due to the presence of such epoxy groups, may be cured at ambient temperature. Moreover, because such compositions are liquids (i.e., they have a definite volume and will assume the shape of their container) the application of pressure to cause them to adapt to the conformation of the circuitry to be encapsulated is not necessary.

The most preferred of these compositions are those which exhibit a low Brookfield viscosity (and which are thus more readily poured and formed into appropriate configuration at room temperature) and those exhibiting a high viscosity index (which are thus more readily pourable at low temperatures).

It has now been found that those encapsulation compositions which are formed employing the ethylene/alphaolefin/(optionally) nonconjugated diene polymers disclosed herein as intermediates (which copolymers possess vinylidene-type unsaturation) will exhibit a desirably high viscosity index (of at least about 75), coupled with an unexpectedly low Brookfield viscosity relative to identical compositions formed from other polymers having a similar composition and molecular weight but not exhibiting vinylidene-type unsaturation.

Moreover, it has also been unexpectedly found that encapsulation compositions based upon copolymers having vinylidene-type unsaturation exhibit increased adhesion to wire relative to compositions based on similar copolymers not possessing vinylidene-type unsaturation.

South African Patent Application No. 824,858 discloses one process by which the polymers of this invention may be prepared. However, the copolymers actually disclosed in this Application are all of too high a molecular weight to be liquid materials. While low molecular weight ($\overline{M}n = 5,000$) polypropylene homopolymer was prepared, polypropylene is comparatively undesirable for use in such pourable encapsulation compositions because (as is indicated by its relatively low viscosity index of about 50) such material is difficult to pour at low temperatures.

Sinn et al, in U.S. Pat. No. 4,404,344, disclose the use of a halogen-free catalyst which may be employed to produce the compounds of this invention, but show only the production of solid, unpourable high molecular weight polymers.

John A. Ewen, "Mechanisms of Stereochemical Control in Propylene Polymerizations with Soluble Group 4B Metallocene/Methylalumoxane Catalysts", Journal American Chemical Soc., Vol. 106, pp. 6355–6364 (1984) discloses that polypropylene made by a dicyclopentadiene zirconium dichloride/methylalumoxane polymerization catalyst exhibits some vinylidene unsaturation (in Table XII). However, as is noted above, polypropylene is less desirable as a base polymer due to its comparatively low viscosity index.

Thus, it is to be noted that none of the above publications disclose the actual making the compounds of this invention nor do they provide any motivation for doing so. The lower Brookfield viscosities and increased adhesion to wire exhibited by electrical encapsulation compositions based upon the intermediates of this invention (relative to compositions based on similar copolymers not having vinylidene-type unsaturation) is completely unexpected from such disclosures.

DESCRIPTION OF THE INVENTION

In one aspect, this invention is directed to a copolymer comprised of ethylene, an alphaolefin having the formula $H_2C=CHR$ wherein R is an alkyl radical containing from 1 to 10 carbon atoms, and (optionally) a nonconjugated polyene;
said copolymer having:
(a) a number average molecular weight of between about 250 and about 20,000; and
(b) a viscosity index of at least about 75;
said polymer exhibiting vinylidene-type unsaturation.

In another respect, this invention is directed to a composition comprised of copolymer chains of ethylene, an alphaolefin having the formula $H_2C=CHR$ wherein R is a alkyl radical containing from 1 to 10 carbon atoms and (optionally) nonconjugated polyene; said polymer chains having:

(a) a number average molecular weight of between about 250 and about 20,000; and
(b) a viscosity index of at least about 75;
at least about 30 percent of said polymer chains exhibiting vinylidene-type unsaturation.

The copolymers of this invention are useful intermediates in the production of epoxy-grafted electrical encapsulation compositions. Such grafted compositions exhibited unexpectedly lower Brookfield viscosities—and thus greater pourability—as well greater adhesion to wire, relative to compositions based on copolymers not possessing vinylidene-type unsaturation.

The copolymers of this invention are copolymers of ethylene, an alphaolefin having the formula $H_2C=CHR$ wherein R is an alkyl radical comprising 1 to 10 carbon atoms and (optionally) a nonconjugated polyene.

The alphaolefins which may be employed in the practice of this invention are compounds of the formula $CH_2=CHR$ wherein R is an alkyl radical containing from one to ten carbon atoms. When R contains more than 2 carbon atoms such radical may be straight chain or branched. Preferred alphaolefins include propylene, 1-butene, 1-pentene, 1-hexene, 3-methyl-1-pentene, 1-heptene, 1-octene and 1-decene.

The polyenes which may be employed in the practice of this invention are nonconjugated. Illustrative of such nonconjugated polyenes are aliphatic dienes such as 1,4-hexadiene, 1,5-hexadiene, 1,4-pentadiene, 2-methyl-1,4-pentadiene, 3-methyl-1,4-hexadiene, 4-methyl-1,3-hexadiene, 1,7-octadiene, 1,9-decadiene, exo and endo-dodicyclopentadiene and the like; exo- and endo-alkenylnorbornenes, such as 5-propenyl-, 5-(buten-2-yl)-, and 5-(2-methylbuten-[2']-yl)norbornene and the like; alkylalkenylnorbornenes, such as 5-methyl-6-propenylnorbornene and the like; alkylidenenorbornenes, such as 5-methylene-, 5-ethylidene-, and 5-isopropylidene-2-norbornene, vinylnorbornene, cyclohexenylnorbornene and the like; alkylnorbornadienes, such as methyl-, ethyl-, and propylnorbornadiene and the like; and cyclodienes such as 1,5-cyclooctadiene, 1,4-cyclooctadiene and the like.

The molar ethylene content of the copolymers of this invention is preferably in the range of between about 20 and about 80 percent, is more preferably between about 30 and about 70 percent, and is most preferably between about 35 and about 65 percent, although higher or lower ethylene contents may be present. The nonconjugated polyene molar percent (when present) generally ranges between 0 and about 25 percent. The remaining mole percent of such copolymers (up to 100%) is comprised of alphaolefin.

The copolymers of this invention generally possess a number average molecular weight of between about 250 and about 20,000, preferably of between about 500 and about 15,000, most preferably of between about 1,000 and about 10,000. Consequently, such copolymers generally possess an intrinsic viscosity (as measured in tetralin at 135° C.) of between about 0.025 and about 0.6 dl/g, preferably of between about 0.05 and about 0.5 dl/g, most preferably of between about 0.075 and about 0.4 dl/g.

Moreover, the copolymers of this invention generally possess a viscosity index of at least about 75, more preferably of at least about 100, and most preferably of at least about 125. The viscosity index of a compound is determined according to ASTM method D2770-74 wherein the viscosity index is related to kinematic viscosities measured at 40° C. and 100° C.

The polymers of this invention preferably exhibit a degree of crystallinity such that, when grafted, they are essentially amorphous.

The copolymer of this invention is further characterized in that it possesses vinylidene-type unsaturation. Thus, one end of such polymer will be of the formula $P-CR=CH_2$ wherein R is as defined above (for the alphaolefins which may be employed) and P represents the polymer chain.

The composition of this invention comprises copolymer chains, at least about 30 percent of which possess vinylidene-type unsaturation. Preferably at least about 50 percent, more preferbly at least about 60 percent, and most preferably at least about 75 percent, of such polymer chains exhibit vinylidene-type unsaturation. The percentage of polymer chains exhibiting vinylidene-type unsaturation may be determined by FTIR spectroscopic analysis or titration.

The copolymer and the composition of this invention may be prepared employing a Group 4 (of the Period Table as is defined on the inside cover of the *Handbook of Chemistry and Physics,* CRC Press, 66th Ed., 1985-1986) catalyst and an aluminoxane cocatalyst.

The catalysts which may be employed are generally of the formula wherein $Q_nMX_{4-n}$ wherein Q is cyclopentadiene, cyclopentadiene substituted with up to five $C_1-C_6$ alkyl groups, or indene; M is zirconium, titanium or hafnium; X is $C_1-C_4$ alkyl, halogen, $CH_2AlR''_2$, $CH_2CH_2AlR''_2$ or $CH_2CH(AlR''_2)_2$ wherein R'' is $C_1-C_6$ alkyl or $OAl(C_1-C_6\ alkyl)_2$, and n is 1, 2 or 3. Preferably Q is cyclopentadiene, methylcyclopentadiene or indene; M is zirconium or titanium; X is methyl, ethyl, Cl or Br; and n is 2 or 3. Most preferably Q is cyclopentadiene; M is zirconium; X is methyl or chlorine and n is 2. Representative catalysts include: $(C_5H_5)_3TiC_2H_5$; $(C_5H_5)_2$; $(CH_3C_5H_4)_2HaCl_2$; $(C_5H_5)_2ZrCH_3Cl$; $(C_5H_5)_3ZrC_2H_5$; $(C_5H_5)_2Zr(CH_3)_2$; $(C_5H_5)_2ZrCl_2$ and $(C_5H_5)_2ZrBr_2$.

The cocatalysts which are typically employed to produce the polymer intermediates of this invention are aluminoxanes either having the linear formula (a) $R'_2AlO-(AlR'O)_n-AlR'_2$ or the cyclic formula (b) $(-AlR'O-)_{n+2}$ wherein R' is linear or branched $C_1-C_6$ alkyl and n is an integer of 2-40; preferably R' is methyl or ethyl and n is 6-20. Most preferably cocatalysts have the formula (b) wherein R' is methyl and n is 10-20. Preferred cocatalysts include linear or cyclic methaluminoxane ethylaluminoxane and butylaluminoxane.

The catalyst system is employed so that the Al/M molar ratio (wherein M is as defined above) is between about 10 and about 10,000, is preferably between about 20 and about 5,000, and most preferably between about 40 and about 2,000.

Polymerization is generally conducted at temperatures ranging between about 20° and about 100° C., preferably between about 30° and about 80° C. Reaction time is not critical and may vary from several hours or more to several minutes or less, depending upon factors such as reaction temperature, the monomers to be copolymerized, and the like. One of ordinary skill in the art may readily obtain the optimum reaction time for a given set of reaction parameters by routine experimentation.

The polymerization may be conducted employing liquid monomer, such as liquid propylene, as the reaction medium. Alternatively, polymerization may be accomplished in the presence of a hydrocarbon inert to the polymerization such as butane, pentane, isopentane, hexane, isooctane, decane, toluene, xylene, and the like.

If so desired, the polymerization may be carried out in the presence of hydrogen to further lower polymer molecular weight. Care should be taken to assure that vinylidene-type unsaturation is not reduced to less than about 30 percent of the polymer chains.

When carrying out the polymerization in a batch-type fashion the reaction medium (if any), alphaolefin, ethylene and (optionally) polyene are charged at appropriate ratios to a suitable reactor. Care must be taken that all ingredients are dry, with the reactants typically being passed through molecular sieves or other drying means prior to their introduction into the reactor. Subsequently, either the catalyst and then the cocatalyst, or first the cocatalyst and then the catalyst are introduced while agitating the reaction mixture, thereby causing polymerization to commence. Alternatively, the catalyst and cocatalyst may be premixed in a solvent and then charged to the reactor. As polymer is being formed, additional monomers may be added to the reactor. Upon completion of the reaction, unreacted monomer and solvent are either flashed or distilled off, if necessary by vacuum, and the low molecular weight copolymer withdrawn from the reactor.

The polymerization may be conducted in a continuous manner by simultaneously feeding the reaction medium (if employed), monomers, catalyst and cocatalyst to a reactor and withdrawing solvent, unreacted monomer and polymer from the reactor so as to allow a residence time of ingredients long enough for forming copolymer of the desired molecular weight and separating the copolymer from the reaction mixture.

The copolymers of this invention possess several unobvious advantages when employed as intermediates for epoxy-grafted electronic encapsulation compositions. As is shown in Table II below, such grafted copolymers unexpectedly exhibit a lower Brookfield viscosity than do graft copolymers produced from copolymer intermediates of the same composition and weight which do not possess vinylidene-type unsaturation. Because of such lower Brookfield viscosity, encapsulation compositions produced from the copolymers of this invention are more pourable at room temperature and are thus more easily employed.

Moreover, because of the high viscosity indexes exhibited by the copolymers of this invention, they retain their fluidity at lower temperatures to a much greater degree than do compounds of similar molecular weight (such as low molecular weight atactic polypropylene).

Further, as is shown in Table III below, electrical encapsulation compositions based upon these copolymers exhibiting vinylidene-type unsaturation exhibit unexpectedly high adhesion to wires.

Consequently, the compounds of this invention are unexpectedly superior intermediates for epoxy-grafted encapsulation compositions.

EXAMPLES

The following Examples are intended to further illustrate the invention and are not intended to limit the scope of the invention in any manner whatsoever.

EXAMPLES 1-4

Ethylene/propylene copolymer was prepared in the following manner. To a 37.2 liter reactor equipped with thermometer, stirrer, monomer inlet tubes for sub-surface addition, catalyst/cocatalyst addition means and a compressor-condenser ebullient cooling system, were added 5000 grams propylene, 655 grams of a 1.16 molar solution of methylaluminoxane in toluene and 200 grams ethylene. The initial reactor temperature was 27° C. The agitator was started and the reactor was open to the cooling system. Ethylene was introduced to reset the reactor pressure to between 170 and 173 psi (1.17–1.19 MPa) at 27° C. The reactor temperature was then increased to 46° C. causing the pressure to rise to 182 psi (1.25 MPa). Subsequently, 64.5 ml of a 0.0384 molar solution of $(C_5H_5)_2ZrCl_2$ in toluene were charged over a period of 15 minutes, which addition produced an exothermic reaction. The reaction temperature was maintained at between 45° and 50° C. while feeding ethylene and propylene at a 1/1 weight ratio into the reactor. After 2.25 hours, i.e., after a total of 6660 grams ethylene and 8000 grams propylene had been fed to the reactor, unreacted monomer was vented off, and 14,800 grams of copolymer were isolated. The results of this copolymerization are summarized in Table I below.

Following essentially the procedure of Example 1, several additional polymerizations (Examples 2, 3 and 4) were performed. The conditions and results of these polymerizations are summarized in Table I.

TABLE I

| Example | 1 | 2 | 3 | 4 |
|---|---|---|---|---|
| Propylene | 5000 | 6000 | 5000 | 5000 |
| Ethylene, initial grams | 200 | 400 | 440 | 333 |
| MAO[1], mmol | 936 | 1030 | 936 | 936 |
| $Cp_2ZrCl_2$[2], mmol | 3.82 | 11.7 | 6.28 | 12 |
| Polymerization temp, (°C.) | 45–50 | 45–48 | 48–54 | 45–50 |
| Polymerization period, (hrs.) | 2.25 | 1.6 | 2.0 | 2.75 |
| E/P feed, molar ratio | 1.25/1 | 1.4/1 | 1.4/1 | 1.6/1 |
| Total feed, ethylene | 6660 | 6500 | 7000 | 6000 |
| Total feed, propylene | 8000 | 6970 | 7730 | 5650 |
| Copolymer Yield, kg | 14.8 | 13.9 | 13.7 | 14.2 |
| E/P, molar ratio | 58/42 | 68/32 | 69/31 | 54/46 |
| Molecular weight (number average) | 4380 | 1840 | 3230 | 2480 |

REMARKS:
[1]MAO: methylaluminoxane
[2]$Cp_2ZrCl_2$: biscyclopentadienyl zirconium dichloride Analysis indicated that in all the above Examples, a major amount of the polymer chains exhibited vinylidene unsaturation.

Examples 5 and 6 and Comparative Experiments A and B

Several ethylene/propylene copolymers were modified by grafting onto them allyl glycidyl ether utilizing an organic peroxide following a process similar to that described in U.S. Pat. No. 4,245,061 to Tachi et al. Two of these copolymers (Comparative Experiments A and B) were prepared using a $VOCl_3$-based Ziegler-Natta catalyst system and two (Examples 5 and 6) were made according to this invention (employing a zirconium catalyst as described in Example 1). The resultant polymers were analyzed, which analyses are summarized in Table II below. The polymers of Comparative Experiments A and B do not exhibit vinylidene-type unsaturation whereas analysis reveals that a major percentage of the polymer chains of Examples 5 and 6 possess vinylidene unsaturation.

TABLE II

| Example or Comp. Experiment | A | B | 5 | 6 |
|---|---|---|---|---|
| VOCl$_3$-catalyzed | yes | yes | — | — |
| Zr-catalyzed | — | — | yes | yes |
| Molecular weight, initial | 2500 | 2500 | 2500 | 2500 |
| Molecular weight, after grafting | 2340 | 2760 | 2460 | 2820 |
| No. epoxy groups/Chain | 2.2 | 2.4 | 2.6 | 3.0 |
| Brookfield viscosity (25° C.)* | 178,000 | 126,000 | 33,000 | 112,000 |

*Determined employing Brookfield [trademark] type HBT viscometer with microcell; Spindle #21.

The above data clearly indicate the lower viscosities observed for epoxy-grafted ethylene/propylene copolymers having vinylidene unsaturation relative to similar grafted copolymers produced from ethylene/propylene copolymer intermediates of identical molecular weight not exhibiting vinylidene-type unsaturation.

It should be noted that the Brookfield viscosity is influenced by molecular weight as well as by the epoxy functionality per chain. It is, therefore, surprising that Example 6 (this invention) exhibits a lower viscosity than Comparative Experiment B (based on copolymer not exhibiting vinylidene unsaturation) although both the molecular weight and the epoxy functionality of the composition of this invention are higher.

Example 7 and Comparative Experiment C

Additional low molecular weight ethylene/propylene copolymers were prepared employing (in Example 7) a catalyst composition comprising (C$_5$H$_5$)$_2$ZrCl$_2$ and (Comparative Experiment C) employing a catalyst composition comprising VOCl$_3$. The zirconium-catalyzed copolymers exhibited vinylidene unsaturation whereas the vanadium-catalyzed copolymers did not exhibit vinylidene-type unsaturation. These copolymers were grafted with allyl glycidyl ether by reacting such copolymers and ethers with dicumyl peroxide. The physical properties of the graft copolymers are shown in Table III. These graft copolymers were formulated (as described in Table III) into electronic encapsulation compositions. The initial Brookfield viscosities of such compositions and the gel times (i.e., the minutes until a viscosity of 10$^5$ centipoise was measured) were determined. In addition, the adhesion of said encapsulation compositions to a length of polyethylene insulated copper wire coated with a cable filling compound was measured by inserting a length of said wire into a 5 inch test tube; pouring in the encapsulation composition to be tested until it filed 4.5 inches of such test tube; allowing the encapsulation composition to cure; and measuring the force required (in pounds) to withdraw the 4.5 inch length of wire. The results of said testing are summarized in Table III.

TABLE III

| Example or Comparative Experiment | 7 | C |
|---|---|---|
| Base Polymer | | |
| Catalyst | (C$_5$H$_5$)$_5$ZrCl$_2$ | VOCl$_3$ |
| Molecular Weight (number average) | 2,500 | 2,500 |
| Graft Copolymer | | |
| Molecular Weight (number average) | 2,770 | 3,020 |
| Weight Percent Epoxy | 4.7 | 4.8 |

TABLE III-continued

| Example or Comparative Experiment | 7 | C |
|---|---|---|
| Brookfield Viscosity (at 25% C) | 138,000 | 350,000 |
| Formulation Components[1] | | |
| EPIREZ 5018 (TM)[2] | 65 | 65 |
| Nonylphenol | 50 | 50 |
| Triethylenetetramine | 8 | 8 |
| Formulation | | |
| Initial Brookfield Viscosity (at 25% C) | 1640 | 3600 |
| Gel Time (min.) | 371 | 65 |
| Adhesion to Wire | 4.8 | 2.9 |

[1]In parts by weight per hundred parts graft polymer
[2]monoglycidyl ether of C$_{12}$-C$_{14}$ aliphatic alcohols available from Celanese.

The above data once again indicate the unexpectedly low Brookfield viscosities exhibited by epoxy-grafted copolymers formed from the vinylidically unsaturated copolymers of this invention vis-a-vis similar copolymers not exhibiting vinylidene-type unsaturation. Moreover, such data indicate the unexpectedly high adherence to wires exhibited by electronic encapsulation compositions based upon the vinylidenically unsaturated copolymers of this invention.

What is claimed is:

1. A copolymer comprised of ethylene and an alpha-olefin having the formula H$_2$C═CHR wherein R is an alkyl radical containing from 1 to 10 carbon atoms; said copolymer having:
   (a) a number average molecular weight of between about 250 and about 20,000 and;
   (b) a viscosity index of at least about 75;
   said polymer exhibiting vinylidene-type unsaturation such that one end of the polymer will be of the formula P—CR═CH$_2$ wherein P represents the polymer chain and R is as defined above.

2. The copolymer of claim 1 wherein said copolymer further comprises a nonconjugated polyene.

3. The copolymer of claim 1 wherein said copolymer has a number average molecular weight of between about 500 about 15,000.

4. The copolymer of claim 3 wherein said copolymer has a number average molecular weight of between about 1,000 about 10,000.

5. The copolymer of claim 1 wherein said copolymer has a viscosity index of at least about 100.

6. The copolymer of claim 5 wherein said copolymer has a viscosity index of at least about 125.

7. The copolymer of claim 1 wherein said copolymer has a molar ethylene content of between about 20 and about 80 percent.

8. The copolymer of claim 1 wherein said copolymer has a molar ethylene content of between about 30 and about 70 percent.

9. The copolymer of claim 1 wherein said copolymer has a molar ethylene content of between about 35 and about 65 percent.

10. The copolymer of claim 1 wherein said alphaolefin is propylene.

11. The copolymer of claim 2 wherein said nonconjugated polyene is selected from the group consisting of 5-ethylidene-2-norbornene, 1,4-hexadiene or dicyclopentadiene.

12. The copolymer of claim 2 wherein said copolymer has a number average molecular weight of between about 500 and about 15,000.

13. The copolymer of claim 12 wherein said copolymer has a number average molecular weight of between about 1,000 and about 10,000.

14. The copolymer of claim 2 wherein said copolymer has a viscosity index of at least about 100.

15. The copolymer of claim 14 wherein said copolymer has a viscosity index of at least about 125.

16. The copolymer of claim 2 wherein said copolymer has a molar ethylene content of between about 20 and about 80 percent.

17. The copolymer of claim 2 wherein said copolymer has a molar ethylene content of between about 30 and about 70 percent.

18. The copolymer of claim 2 wherein said copolymer has a molar ethylene content of between about 35 and about 65 percent.

19. The copolymer of claim 2 wherein said alphaolefin is propylene.

20. The copolymer of claim 1 wherein said copolymer consists of ethylene and an alphaolefin having the formula $H_2C=CHR$ wherein R is an alkyl radical containing 1 to 10 carbon atoms.

21. The copolymer of claim 20 wherein said alphaolefin is propylene.

* * * * *

REEXAMINATION CERTIFICATE (2865th)
United States Patent [19]
Rim et al.

[11] B1 4,668,834
[45] Certificate Issued May 7, 1996

[54] LOW MOLECULAR WEIGHT ETHYLENE-ALPHAOLEFIN COPOLYMER INTERMEDIATES

[75] Inventors: Yong S. Rim; Demetreos N. Matthews, both of Bethany, Conn.

[73] Assignee: Uniroyal Chemical Company, Inc., Middlebury, Conn.

Reexamination Request:
No. 90/003,778, Apr. 3, 1995

Reexamination Certificate for:
Patent No.: 4,668,834
Issued: May 26, 1987
Appl. No.: 787,869
Filed: Oct. 16, 1985

[51] Int. Cl.$^6$ .................. C08F 210/16; C08F 210/18
[52] U.S. Cl. ................. 585/12; 585/10; 585/18; 585/510; 585/512
[58] Field of Search .................. 585/12, 510, 512, 585/10, 18; 526/160, 165, 282, 283, 336, 338.1, 338.2, 338.3, 338.4, 338.5, 338.6

[56] References Cited

U.S. PATENT DOCUMENTS

| | | |
|---|---|---|
| 3,676,521 | 7/1972 | Stearns et al. |
| 4,404,344 | 9/1983 | Sinn et al. ............... 526/160 |
| 4,542,199 | 9/1985 | Kaminsky et al. ........ 526/160 |
| 4,704,491 | 11/1987 | Tsutsui et al. ............ 585/10 |
| 5,324,800 | 6/1994 | Ewen et al. ............... 526/160 |

FOREIGN PATENT DOCUMENTS

0060609A1 9/1982 European Pat. Off. .
0129368A1 12/1984 European Pat. Off. .

OTHER PUBLICATIONS

"Preliminary Results On Ethlene/Propene Copolymerization in the Presence of $C_{p2}Ti(CH_3)_2/Al(CH_3)_3/H_2O$", V. Busico et al., *Makromol. Chem.*, 184, 2193–2198 (1983).

"Mechanisms of Stereochemical Control in Propylene Polymerizations with Soluble Group 4B Metallocene/Methylalumoxane Catalysts", J. A. Ewen, J. Am. Chem. Soc., 106, 6355–6364 (1984).

"Polymerization Behavior of Soluble Ring–Substituted Zirconocene (IV) Dichlorides And Methyl Alumoxanes As Well As Other Cocatalysts With Respect To 1–Olefins", Dissertation of K. Kulper, Univ. of Hamburg, 31 Jan. 1985, Indexed in Germany National Library publication, Sep., 1985, pp. 5,21,22,123.

American Standards for Testing and Materials, ASTM, Standard D2270–74. no date available.

*Primary Examiner*—Glenn Caldarola

[57] ABSTRACT

Low molecular weight copolymers comprised of ethylene, an alphaolefin and (optionally) a nonconjugated polyene, which copolymers have a viscosity index of at least about 75 and vinylidene-type unsaturation, possess unexpected advantages as intermediates in epoxy-grafted electrical encapsulation compositions.

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–21 is confirmed.

* * * * *